Jan. 15, 1963 W. A. WOOTTEN 3,073,912

MAGNETIC RECORDING METHOD AND APPARATUS

Original Filed Dec. 11, 1953 2 Sheets-Sheet 1

INVENTOR.
WILLIAM A. WOOTTEN
BY [signature]
Attorney

Jan. 15, 1963 W. A. WOOTTEN 3,073,912

MAGNETIC RECORDING METHOD AND APPARATUS

Original Filed Dec. 11, 1953 2 Sheets-Sheet 2

INVENTOR.
WILLIAM A. WOOTTEN
BY [signature]
Attorney 3,073,912
Patented Jan. 15, 1963

3,073,912

MAGNETIC RECORDING METHOD AND APPARATUS

William A. Wootten, Hollywood, Calif. (1324 Palos Verdes Drive W., Palos Verdes Estates, Calif.)

Continuation of abandoned application Ser. No. 397,571, Dec. 11, 1953. This application Sept. 12, 1957, Ser. No. 683,567
7 Claims. (Cl. 179—100.2)

This invention relates to methods and apparatus for recording and reproducing electrical signals with magnetic tape. In the present specification and claims, the words "magnetic tape" are used to designate any type of tape or wire capable of temporarily or permanently retaining the characteristics of a magnetic field to which it is exposed. Generally, the preferred type of tape comprises a carrier of cellulose acetate employing magnetic paramagnetic particles and coated with a suitable metallic oxide.

This application is a continuation of my prior application entitled Magnetic Recording Apparatus, filed December 11, 1953, Serial No. 397,571, now abandoned.

Conventional methods and apparatuses for recording electrical signals on magnetic tape generally employ a recording head housing coils of wire for generating a magnetic field. The characteristic of this magnetic field is controlled by the signals to be recorded, which signals are fed into the recording head. A tape or wire is moved across the recording head to expose it to the signal modulated magnetic field and the signal thereby recorded on the tape. Generally, these systems are not well adapted to extremely high frequency signals because: first, to preserve tolerable fidelity, the tape must be moved past the recording head at an extremely rapid speed; and second, the inductive impedance of the field generating coils in the recording head is prohibitive at such high frequencies.

The primary object of the present invention is to provide an improved method and improved apparatus particularly well adapted for recording very high frequency signals on a magnetic tape.

More particularly, it is an object of the invention to provide a method and an apparatus for recording high frequency signals without the necessity of appreciably increasing the normal speed of the magnetic tape past the recording mechanism.

Another more general object is to provide a recording and reproducing method and apparatus for high frequency signals which has an extremely flat response over the frequency ranges involved and yet in which the recording apparatus is considerably simpler and more economical to manufacture than the recording systems heretofore available.

In my copending United States application Serial No. 335,731, filed February 9, 1953, now Patent No. 2,933,555 and entitled System for Modulating a Magnetic Field for Electrical Reproduction, there is disclosed a method and apparatus for recording on and reproducing from a magnetic tape a television program. In this system, the signals to be recorded are employed to modulate either the current density or velocity of a beam of charged particles whereby the magnetic field existing about such beam is modulated. The modulated magnetic field in turn reacts with a fixed magnetic field to provide a net modulated magnetic field which is recorded on the moving tape.

The present invention makes use of some of the theories and principles set forth in the above referred to patent, including that of the use of a modulated stream of charged particles, i.e., a modulated electric current, and the directing of this charge stream or current so that its surrounding magnetic field interacts with a predetermined fixed magnetic field, thus providing a net or resultant modulated magnetic field to which the recording tape is exposed. Broadly, the present invention deals with an improvement in the relation between the modulated charge stream or current, the fixed magnetic field, and the tape, the relationships being such as to produce a warped, or angulated, resultant field, which is recorded on the tape. The invention provides also simple forms of recording apparatus utilizing these principles.

In common with the system of my said prior patent, the usual recording coils are eliminated and much higher frequencies may be fed into the apparatus without the increased inductive impedance problem. Further, the apparatus employs high gain video amplifiers in the reproduction of the signals from the tape whereby the initial tape exposure time may be considerably reduced over that time heretofore thought necessary. As a result, the tape may be moved past the recording apparatus at a relatively slower speed.

A better understanding of the principles and apparatuses involved for realizing the above objects and advantages will be had by referring to the accompanying drawings in which.

Figure 1:
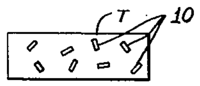
FIG. 1 is a greatly enlarged schematic transverse cross-section of a magnetic tape.

Referring to FIG. 1 there is shown in transverse cross-section a tape T incorporating small magnetic particles 10 which may be considered as miniature bar magnets arranged in any arbitrary manner. These particles 10, due to their magnetic properties, have a tendency to aline their longitudinal axes with the lines of force of a magnetic field.

Figure 2:
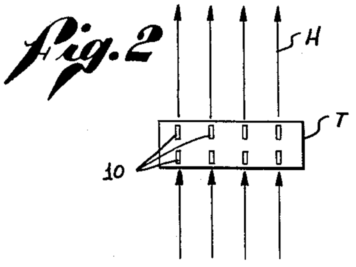
FIG. 2 is a view similar to FIG. 1 showing schematically the effect of a uniform magnetic field passing through the tape.

For example, in FIG. 2 there is shown the tape T of FIG. 1 with a strong magnetic field H passing normally therethrough. As shown, the particles 10 have alined themselves with the lines of force represented by the arrows.

Figure 3:
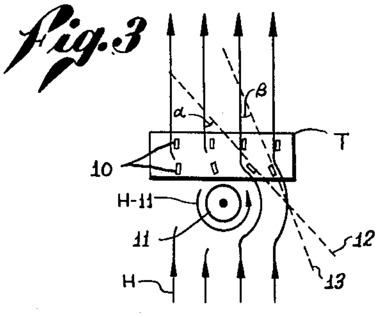
FIG. 3 illustrates the influence of a further magnetic field on the tape set up about a current carrying conductor.

If now a further magnetic field is generated in the vicinity of the tape and the first magnetic field, the lines of force of the net resulting magnetic field will appear warped and augmented where components of the lines of force of the additional field are in the same direction as the original field, or diminished in the event such components are in the opposite direction. In FIG. 3 there is represented in cross-section a conductor 11 carrying a current passing normally out of the plane of the paper as indicated by the dot. About this current carrying conductor there will be set up a magnetic field H–11 encircling the conductor 11 as shown. To the right of the conductor the field H–11 will augment and warp the lines of force of the uniform field H. In other words, the net resulting magnetic field lines of force will pass through the tape T at an angle. On the left hand side of the conductor 11, however, the magnetic field H–11 will tend to annul the uniform field H and thus diminish the intensity of this field portion passing through the tape. The result of this action, as shown in FIG. 3 by way of example, is that to the right of the conductor 11, the relatively close magnetic particles are exposed to a net magnetic field having a direction indicated by the axis 12 which forms an angle $\alpha$ with the vertical. Further away from the conductor 11 where the net magnetic field is somewhat reduced, the angulation of the magnetic particles 10 is correspondingly less as indicated by the axis 13 and angle $\beta$.

Figure 4:
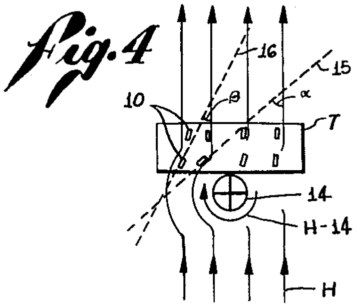
FIG. 4 is a view similar to FIG. 3 wherein the current in the conductor is reversed in direction.

FIG. 4 illustrates the same principle discussed in FIG. 3, except that current is carried in a conductor 14 into the plane of the drawing as indicated by the cross. The magnetic field H–14 set up about the conductor 14 is thus in a direction opposite to that shown in FIG. 3. If the current through the conductor 14 is of the same magnitude as was the current through conductor 11 in FIG. 3, the close paramagnetic particles 10 to the left of the conductor will form angles $\alpha$, and those somewhat further away, angles $\beta$ with the vertical respectively, as indicated by axes 15 and 16. The particles to the right of the conductor, however, will be exposed to a diminished net magnetic field.

It is to be noted that even a slight angulation of the magnetic particles is sufficient to form a record of the signal. Furthermore, since the general direction of the net magnetic field is substantially the same, that is to say, since there is always an upwardly directed component even though its magnitude may vary, there is no rotation of the magnetic particles through 180° as occurs in an alternating current recording system. Therefore, not only is the response of the particles to a magnetic field far more rapid when all that is necessary is an angulation rather than a complete reversal, but also, far more information can be recorded in a limited space than heretofore thought possible.

Figure 5:
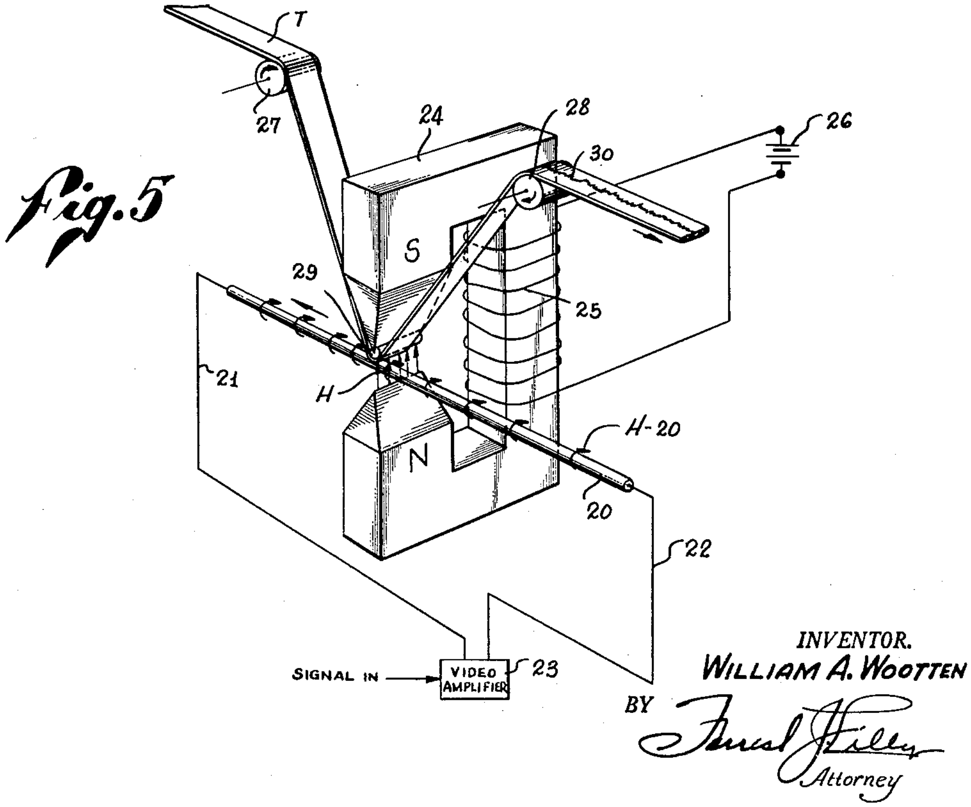
FIG. 5 is a highly schematic diagram of an apparatus for recording signals on a tape of the type shown in FIGS. 1–4.

A preferred apparatus for taking advantage of the above-noted principles is shown in FIG. 5. In general, the system comprises a rectilinear conductor 20 connected through conductors 21 and 22 to the output of a video amplifier 23. The input signal to be recorded is fed into the video amplifier 23 as indicated. Current passing through the conductor 20 will set up a magnetic field as indicated at H–20 which field will vary in magnitude in accordance with the video signals.

The uniform magnetic field H to be modulated by this field H–20 is provided by a C-shaped magnet 24 of either the permanent type or of a direct current operated electromagnet type. In the latter event, there is provided a coil 25 and battery 26 whereby the field strength may be controlled. The north and south poles of magnet 24 are arranged to straddle the wire conductor 20 whereby the field will pass normally through the conductor. The magnetic tape T on which the net modulated magnetic field is to be recorded passes over stabilizing drums 27 and 28, the portion therebetween being looped downwardly over a guide tip 29 on the south pole of the magnet to position the tape closely adjacent the magnetic fields.

With this arrangement, movement of the tape in the direction indicated by the arrow, while feeding in a high frequency signal to the amplifier 23, will result in the magnetic field H being warped and augmented or diminished in accordance with the varying magnetic field H–20 about the conductor 20, whereby variable angulations of the magnetic particles on the tape T will resullt. This recorded signal on the tape is represented at 30 in FIG. 5. Because of the fact that a single relatively straight conductor 20 is used, a flat frequency response over very high frequency ranges may be achieved. Further, because only the degree of angulation of the magnetic particles is used to record the signal rather than a complete reversal thereof, the tape T may be moved relatively slowly without loss in fidelity.

It will be appreciated accordingly that since a considerable amount of information is recorded on the tape over a given length, it is not feasible to employ a conventional pickup head using coils to detect this signal. Especially is this true when high frequencies are involved due to the inductive impedance limitations of coils operating at such high frequencies.

Figure 6:
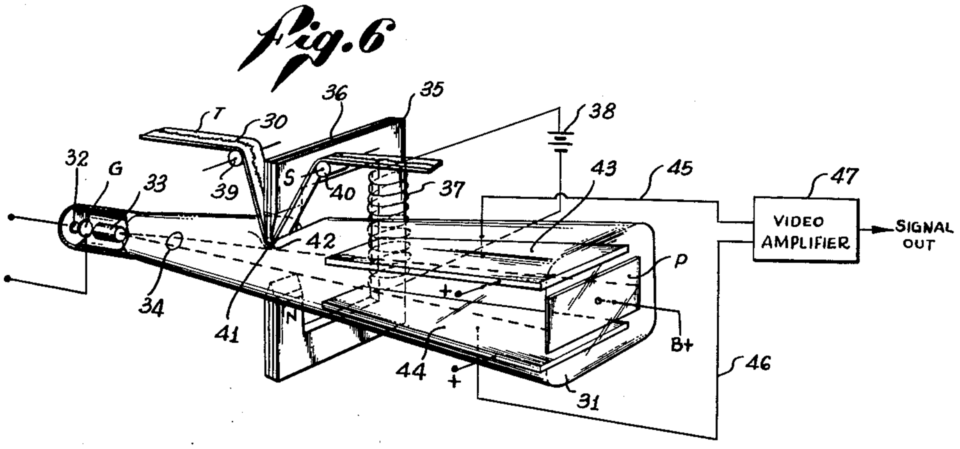
FIG. 6 is another highly schematic diagram illustrating an apparatus for reproducing the signals recorded on the tape by the apparatus of FIG. 5.

FIG. 6 illustrates a reproducing apparatus in accordance with the present invention for detecting the signal recorded on the tape T with the apparatus of FIG. 5. In FIG. 6 there is shown an electron gun comprising an evacuated elongated tube 31 provided with a cathode 32, control grid G, and accelerating anode tube 33 for directing an electron beam 34 to an anode plate P connected to a high voltage source B+. The various elements thus far described in this tube are entirely conventional and connections to proper grid and filament voltages and accelerating potentials are omitted for the sake of clarity.

Substantially midway of the ends of the tube there is provided a C-shaped member 35 supporting a magnetic lamina 36 to provide a short-circuiting flux path for the fields set up by the paramagnetic particles in the tape T. A biasing magnetic field through this lamina may be provided by means of a coil 37 and battery 38, or if desired, the lamina 36 may be constructed of permanent magnetic material.

The tape T is arranged to pass about two stabilizing drums 39 and 40 disposed on either side of the south pole of the member 35 as shown, the tape travelling downwardly into a substantially V-shaped groove 41 transversely formed in the tube 31. The tape is guided about the tip of the pole piece S by a guide bead 41. This arrangement permits the tape to be positioned relatively close to the beam 34 even though the beam is operating in a vacuum.

The tube 31 also includes a pair of electrostatic collector plates 43 and 44 connected by leads 45 and 46, respectively, passing through glass seals to the exterior of the tube 31 to a video amplifier 47 from which an output signal is derived. Each of the plates 43 and 44 may be provided with a small net positive charge as indicated by the + signs for preventing stray electrons from the beam 34 from striking the plates.

In operation, the exposed tape is passed about the drum 39, guide bead 42 and drum 40 whereby the biasing magnetic field from the lamina 36 and the signal field set up by the magnetic characteristics of the tape react with the magnetic field inherently existing about the beam 34 passing thereunder, to deflect the beam. The beam therefore will be moved generally towards or away from one or the other of the plates 43 and 44 in accordance with the signals on the tape. Since this beam constitutes charged particles it will modulate the net charge content on the plates 43 and 44 in a push-pull manner in accordance with such tape signals. These changes in the net charge content of the plates will cause small currents to flow in the conductors 45 and 46 and these current signals will be amplified in the video amplifier 47 to provide an output signal.

It will be readily appreciated that the electron beam 34 can be moved extremely rapidly, and thus the high frequency signals recorded on the tape as indicated at 30 can be reproduced with high fidelity. While it is true that the signals initially recorded on the tape are necessarily weak inasmuch as an angulation rather than a reversal of the tape particles constitutes the record, present day video amplifiers can be made with sufficiently high gain and linearity to easily reproduce these signals.

Figures 7, 8:
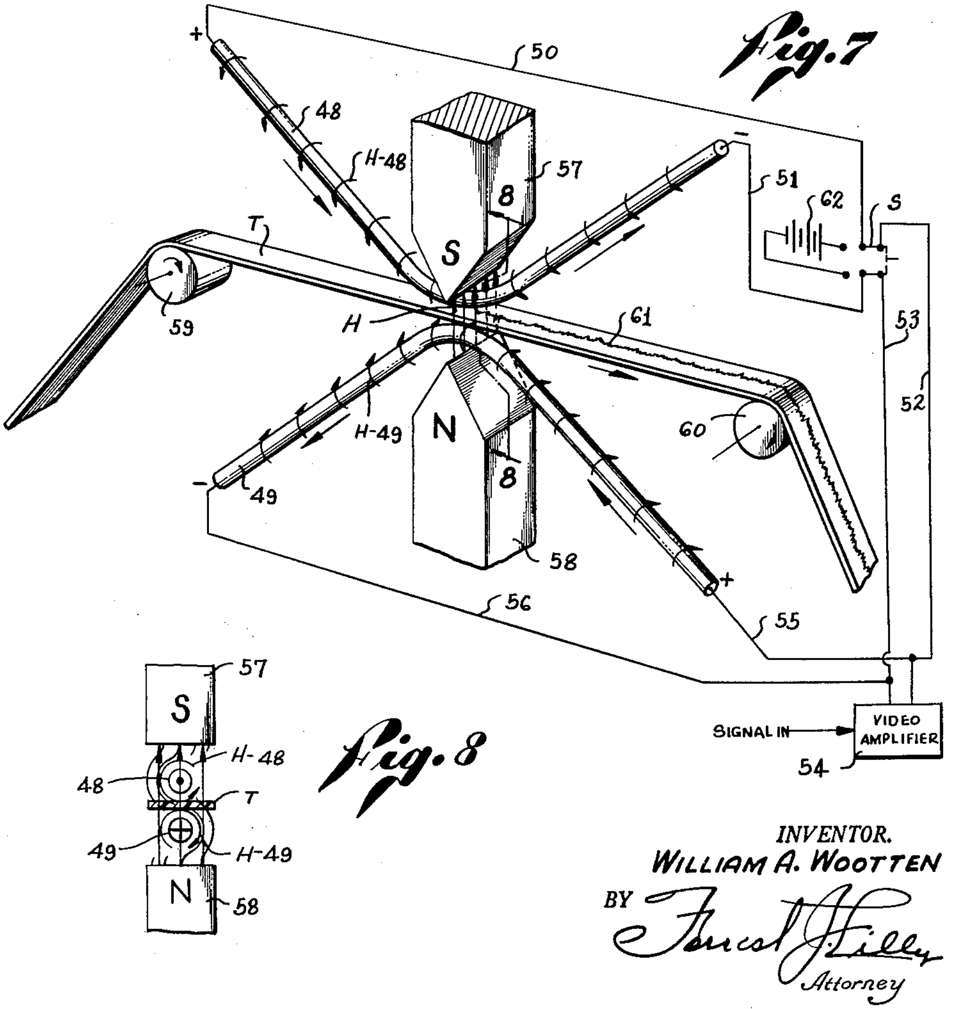
FIG. 7 illustrates a modified recording apparatus in accordance with the invention; and, FIG. 8 is a cross-section taken in the direction of the arrows 8—8 of FIG. 7.

FIG. 7 illustrates a modified type of recording apparatus in accordance with the present invention. In this instance, there are employed two coplanar current carrying conductors 48 and 49 bent respectively into wide V shapes with the vertices of the V's in opposed positions. The conductor 48 has its respective ends connected by leads 50 and 51 through a double pole switch S to conductors 52 and 53 in turn connected to the output of a video amplifier 54. The input signal to be recorded is fed into the input of the amplifier 54 as shown.

The same output signal on the video amplifier is simultaneously fed to the ends of the conductor 49 by leads 55 and 56. When very high frequencies are involved, it is important that the two current carrying conductors 48 and 49 be of the same length and that the leads from the ends of these conductors to the output of the video amplifier be of the same length.

Disposed within the vertices of the V-shaped conductors there may be provided the south and north poles respectively, of a C-shaped magnet as shown at 57 and 58. A tape T is arranged to be moved between the poles of this magnet and the vertices of the conductors 48 and 49 by means of stabilizing drums 59 and 60.

As in the case of the recording apparatus illustrated in FIG. 5, the magnetic poles 57 and 58 provide a uniform bias field which is modulated by the magnetic fields set up about the conductors 48 and 49. In the embodiment of FIG. 7, it is possible to avoid the use of magnetic material close to the tape by throwing the switch S to its other position to connect a battery 62 across the conductor ends 48. Current flowing about this battery circuit will cause a magnetic field to be set up about the conductor 48 which may serve the purpose of the biasing field formerly set up by the C magnet.

In the operation of the device shown in FIG. 7, input signals to be recorded are fed into the video amplifier 54 and these amplified signals passed through the conductors 48 and 49 in the direction indicated by the arrows, that is, from plus to minus. These signals will set up counter-rotating magnetic fields H–48 and H–49, respectively, which fields will add together at the vertex portions of the conductors to provide a relatively strong field only at this point.

The variation in the field strength of the fields H–48 and H–49 in accordance with the signals fed to the conductors from the video amplifier will modulate the constant biasing field extending from the north to the south pole of the magnet to angulate the magnetic particles in the tape T as it is moved over the drums 59 and 60. The signal recorded on the tape is indicated at 61. The primary advantage of this arrangement over that shown in FIG. 5 is the fact that the field strength at the point where the recording takes place on the tape is substantially doubled by the use of two conductors rather than just one. The inductive impedance of each of these conductors is quite small and therefore the apparatus is suitable for ultra high frequencies. As pointed out above, the magnetic poles 57 and 58 may be disposed of and the biasing field set up by means of the battery 62 and conductor 48 by simply throwing the switch S to its other position.

The signal, recorded with the apparatus of FIG. 7, may be reproduced by the apparatus shown in FIG. 6.

Further modifications incorporating the principles of the present invention will occur to those skilled in the art. The particular forms of recording and reproducing devices chosen for illustrative purposes are therefore not to be thought of as limiting the scope and spirit of the invention.

I claim:

1. The method of recording electrical signals on a travelling magnetic recording element that includes, creating a single substantially constant, unidirectional magnetic field which passes through the recording element in a direction transverse to the direction of travel of said element, and angularly modulating said magnetic field in the region of said recording element by directing a flow of current modulated by said signals through said unidirectional field and in close proximity to said recording element, including the step of combining the magnetic field around said current with said unidirectional field and thereby producing a resultant angularly modulated field passing through said recording element.

2. Apparatus for recording an electrical signal current in magnetic tape comprising: a recording magnet including an air gap for producing a single constant unidirectional magnetic field thereacross, means whereby the magnetic field surrounding said signal current reacts with said constant unidirectional magnetic field to produce a resultant angle modulated magnetic field, including means for directing said signal current to flow through said air gap with a component of motion transversely of said unidirectional magnetic field, and means for guiding a travelling magnetic tape through said resultant magnetic field.

3. Apparatus for recording an electrical signal current in magnetic tape comprising: a recording magnet including an air gap for producing a single constant unidirectional magnetic field thereacross, means whereby the magnetic field surrounding said signal current reacts with said constant unidirectional magnetic field to produce a resultant angle modulated magnetic field, including an electrical conductor extending through said air gap transversely of said unidirectional magnetic field, and means for passing said signal current therethrough, and means for guiding a travelling magnetic tape through said resultant magnetic field.

4. An apparatus according to claim 3, in which said recording magnet comprises a C-shaped magnet having its north and south poles in opposed spaced relationship, said conductor and tape being positioned between said poles.

5. Apparatus for recording an electrical signal current on tape comprising: means for guiding a travelling magnetic tape through a recording region, means creating a single fixed unidirectional magnetic field through said tape in said recording region, and means whereby a modulated magnetic field around said signal current reacts with said fixed field in said recording region to produce a resultant magnetic field of variable angle through said tape for recordation thereon, including an electrical conductor extending through said recording region adjacent to said tape in a direction transvesely of said fixed field, and means for passing said signal current through said conductor.

6. The subject matter of claim 5, in which said electrical conductor is bent into a V shape and there is provided a second conductor of similar V shape, said conductors being coplanar and positioned with the vertices of the V's in opposed spaced relationship, said tape passing between the vertices; and means for passing a signal current through the second conductor, the currents in each of said conductors being substantially in phase and passing in opposite directions whereby the magnetic fields set up about the conductors will reinforce each other between the vertices.

7. The subject matter of claim 5, wherein said means creating a fixed magnetic field comprises a second conductor coplanar with said electrical conductor and positioned adjacent thereto, said tape passing between said conductors; and means for passing a constant current through the second conductor whereby said substantially constant magnetic field is set up about the second conductor.

References Cited in the file of this patent

UNITED STATES PATENTS

| | | |
|---|---|---|
| 2,464,807 | Hansen | Mar. 22, 1949 |
| 2,531,642 | Potter | Nov. 28, 1950 |
| 2,724,021 | Goeppinger | Nov. 15, 1955 |
| 2,736,822 | Dunlap | Feb. 28, 1956 |
| 2,743,320 | Daniels et al. | Apr. 24, 1956 |
| 2,768,243 | Hare | Oct. 23, 1956 |

FOREIGN PATENTS

| | | |
|---|---|---|
| 552,290 | Italy | Nov. 20, 1956 |